July 5, 1932.  M. S. JOHNSON  1,865,760
BRAKE SLACK ADJUSTER
Filed May 31, 1930   3 Sheets-Sheet 2
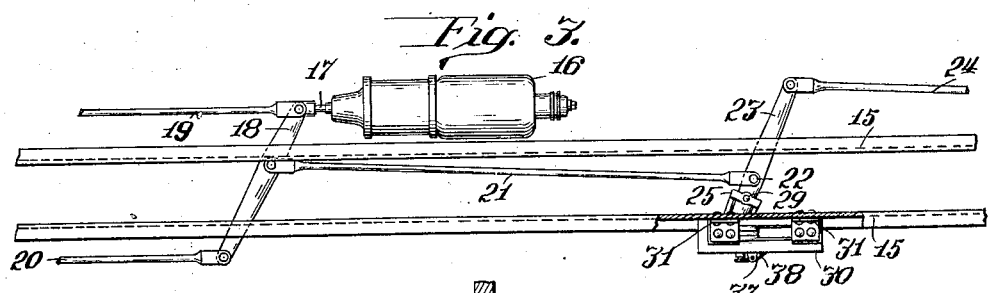
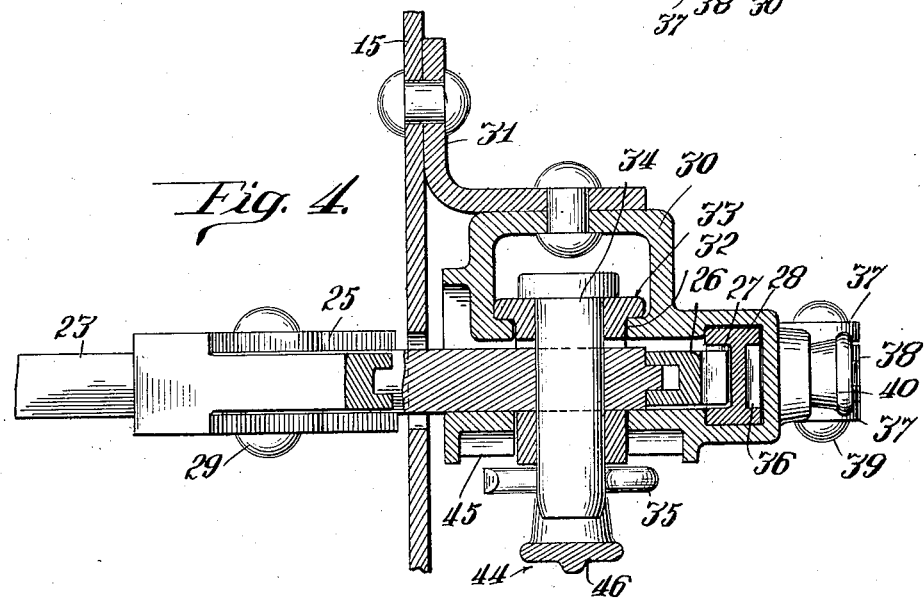
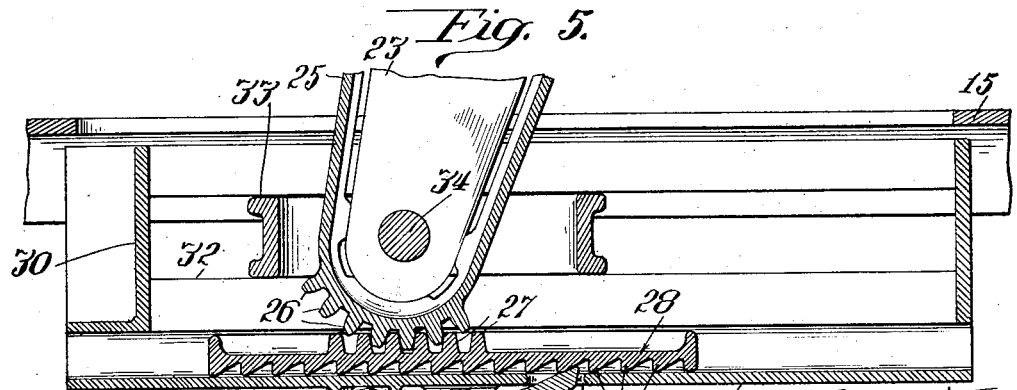

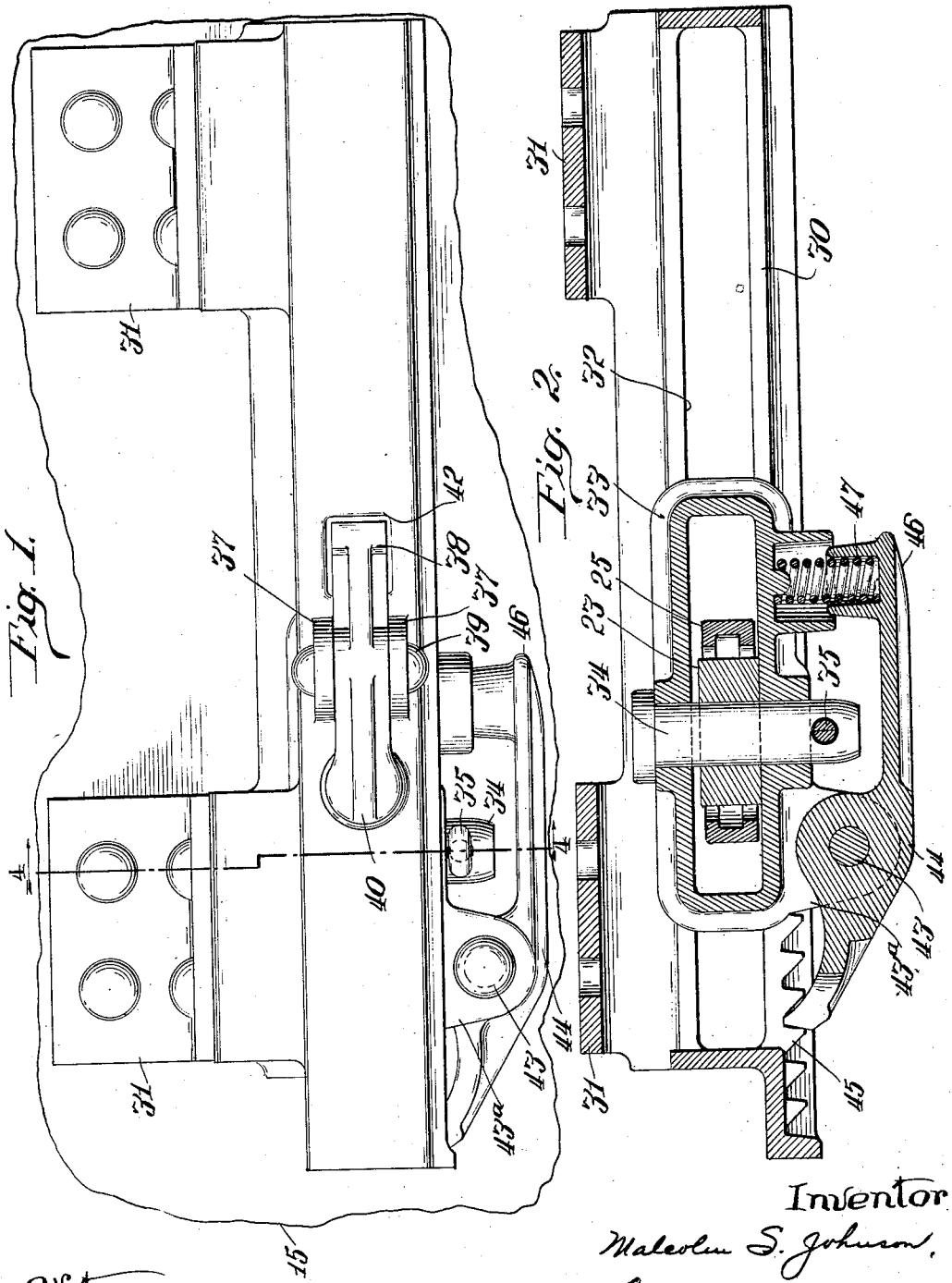

July 5, 1932.　　　M. S. JOHNSON　　　1,865,760
BRAKE SLACK ADJUSTER
Filed May 31, 1930　　　3 Sheets-Sheet 3

Patented July 5, 1932                                                          1,865,760

UNITED STATES PATENT OFFICE

MALCOLM S. JOHNSON, OF CHICAGO, ILLINOIS, ASSIGNOR TO TRANSERV CORPORATION, OF CHICAGO, ILLINOIS, A CORPORATION OF ILLINOIS

BRAKE SLACK ADJUSTER

Application filed May 31, 1930. Serial No. 457,740.

My invention relates to an automatic brake slack adjuster wherein the fulcrum point for the semi-floating lever will automatically adjust itself during operations of the lever, so as to reduce the travel of the piston of the air operated mechanism. That is to say, my improved means is adapted to automatically adjust itself so as to position certain elements of the brake gearing or mechanism in order that a uniform piston travel may be maintained for efficient braking operations while at the same time maintaining proper predetermined brake-shoe clearance.

My invention has for its object the provision of mechanism of simple construction, which at the same time will be positive in its operation so as to prevent undue or excess piston travel during braking operations.

The objects and advantages of my invention will be readily comprehended from the detailed description of the accompanying drawings, wherein:

Figure 1 is a side elevation of my improved slack adjuster.

Figure 2 is a longitudinal sectional view.

Figure 3 is a plan view of a portion of the brake gearing, illustrating the application of my invention thereto, the sills being in section.

Figure 4 is a cross sectional view taken substantially on the off-set line 4—4 of Figure 1, as viewed by the arrows.

Figure 5 is a sectional plan of a portion of the mechanism, illustrating a portion of the semi-floating lever in operating position and the mechanism in partial slack take-up position.

Figure 6:
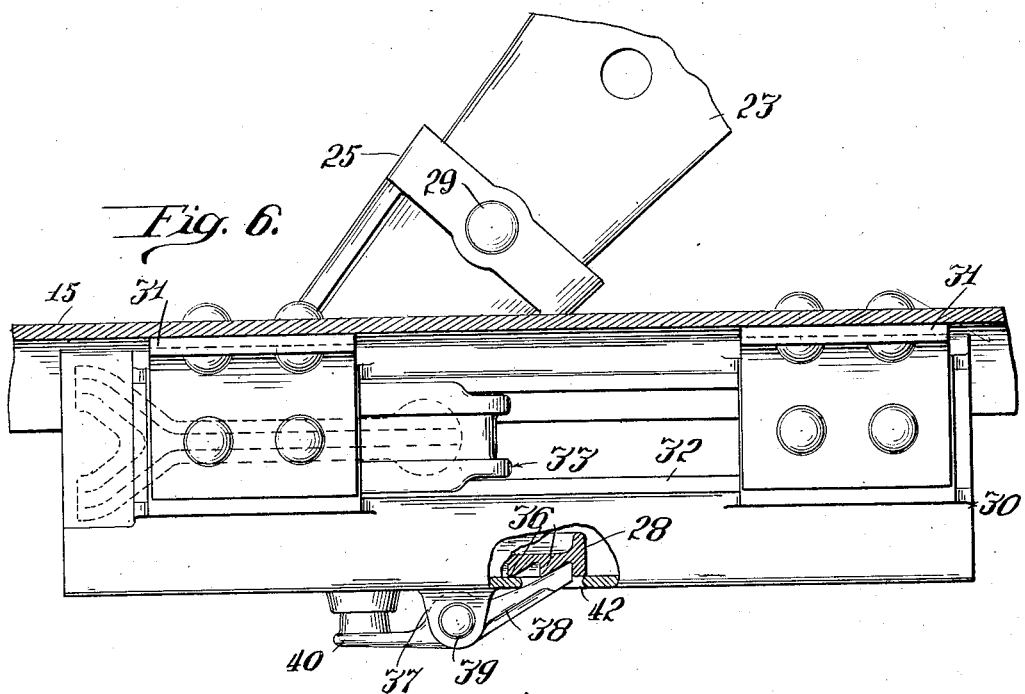
Figure 6 is a plan view of my invention, with a portion broken away and shown in section, illustrating the semi-floating lever in released position, with the mechanism in normal initial position.

The invention is shown in Figure 3 applied to a conventional type of brake operating mechanism for railroad cars, with the draft or center sills of the car indicated at 15, 15; the usual air cylinder for operating the brake gearing being shown at 16.

The piston 17 of the cylinder 16 is operatively connected by means of a proper pivotal connection, with lever 18 and rod 19. The rod 19 is intended to be connected at its opposite end with the usual hand operated brake-staff not shown.

Lever 18, like other levers of the brake gearing, is disposed horizontally and therefore usually extends through suitable slots in the center sill members (although in some instances the lever may extend beneath the sills) and the other end of lever 18 is pivotally connected with rod 20 which controls the usual brake-beam controlling levers at one end of the car; the latter not being shown because they form no part of my invention.

Lever 18, at an intermediate point, has a rod 21 pivotally connected thereto and this rod at its opposite end is pivotally connected at 22 to a semi-floating lever 23.

The long end of lever 23 has a rod 24 pivotally connected thereto; the opposite end of rod 24 being adapted to control the brake beam actuating levers at the end of the car opposite to that where the brake-beam actuating levers are located which are controlled by rod 20.

The opposite end of lever 23, as shown in Figure 5, is provided with an extension or closed ended sleeve 25 of suitable length; the closed end of the sleeve 25 being arcuate and provided with teeth to form a segmental pinion 26 which is adapted to mesh with the rack-teeth 27 of a slidingly mounted rack member 28.

The sleeve 25 is riveted at 29 to the lever 23 so as to hold the sleeve immovably on the lever 23. Members 28, which, together with pinion 26, constitute lever anchor means, is in the nature of an elongated block or plate and slidingly mounted in a suitable supporting housing or elongated element 30, which is preferably shown supported by means of brackets 31, 31, from a center sill member 15. The housing 30 is provided with a slot 32 in its side wall adjacent to the center sill; the slot being of sufficient length for lever travel.

Slidingly mounted in housing 30 is an open-sided block or member 33 adapted to travel lengthwise of the housing 30; the element 33 constituting the fulcrum member for the lever 23. The end of lever 23 and its sleeve 25 extends through the sides of element 33; the lever 23 being pivotally secured to element 33 by means of the pin 34, the lower end whereof is held in place by a suitable cotter-pin as at 35.

Rack member 28 is slidably mounted in a suitable manner on the side wall of the housing 30 so as to travel from end to end; and the rack member 28 is also provided on its outer side with teeth 36.

The outer side wall of the housing 30 is shown provided with a pair of parallel lobes 37, between which a pawl 38 is pivotally mounted at 39.

The pawl 38 is provided with a heel 40 formed to receive one end of a suitable spring 41, whose opposite end bears against the side wall of housing 30.

The spring 41 constantly keeps the tip of pawl 38 in mesh with the teeth 36 of sliding rack member 28; the side wall of the housing 30 being provided with a suitable opening, as at 42, to permit the tip of the pawl to extend into contact with rack member 28.

Pawl 38 maintains the rack member 28 in its adjusted positions.

Disposed on the lower side of the housing 30 and pivotally secured at 43 to suitable lobes or extensions 43ᵃ on element 33, is a pawl 44, whose tip is adapted to engage with a rack 45 formed on the lower wall or side of the main housing 30.

The pawl 44 is provided with a heel 46 which is adapted to receive one end of a suitable spring 47, whose opposite end bears against member 33. Pawl 44 is therefore adapted to move with element 33 when the latter moves longitudinally of the housing.

Figure 7:
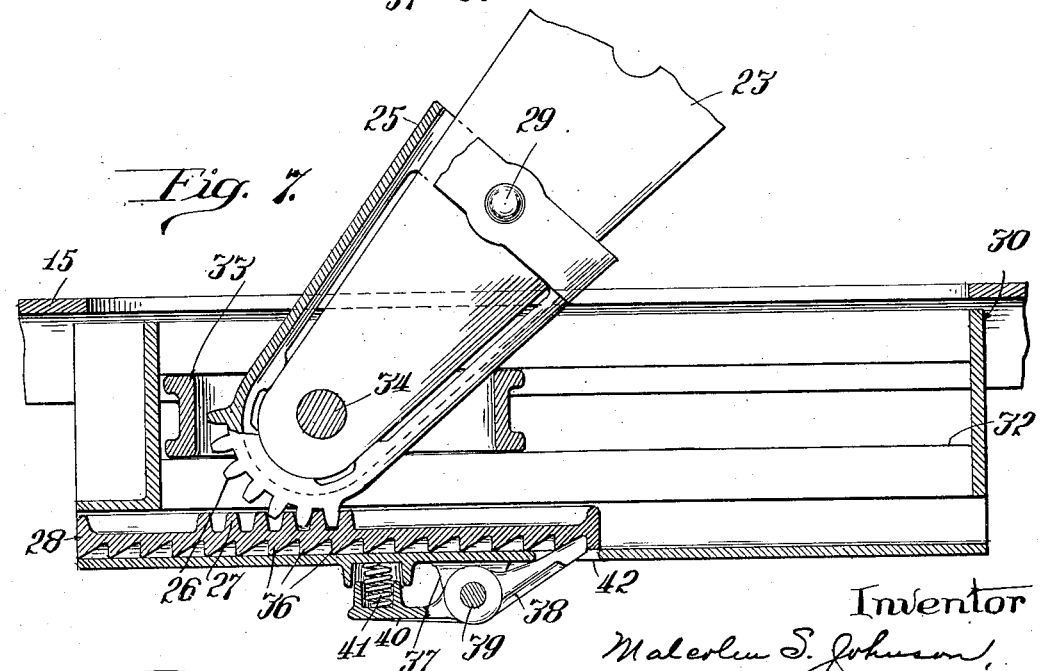
Figure 7 is a sectional plan view of the mechanism positioned as shown in Figure 6.

In Figure 7, I illustrate the mechanisms in initial positions, namely when the brakes are in released position and with new or unworn shoes and wheels and with the usual required clearance between the shoes and wheels.

The brake mechanism is operated in the usual manner, either by means of the air operated piston 17, or by means of the hand brake mechanism through the medium of pull rod 19. As long as the shoes and wheels are unworn, the take-up mechanism will remain in the position shown in Figure 7.

As soon as the wear on the shoes or the wheels reaches a predetermined degree, which induces an excess angularity during brake applying operation of lever 23, then the segmental pinion 26 will cause sliding element 28 to shift to the right in Figure 7 a distance sufficient to induce pawl 38 to engage another tooth of rack element 28 and prevent return of element 28 back to its original or initial position shown in Figure 7 and thus provide a new anchoring point for the lever 23. As soon as the brakes are released and lever 23 swings back to released position, the segmental pinion 26, meshing with the teeth 27 of rack or anchor element 28, will cause the element 33 to be shifted toward the right in Figure 7 and thus reposition the fulcrum point 34 of lever 23, because pawl 44, pivotally secured to member 33, will have engaged with an advanced tooth or teeth of rack 45 thereby preventing the return movement of member 33.

It will be understood that during normal operation of the brake mechanism, a slight shifting of rack member 28 is possible, but, as soon as the piston travel or brake-shoe clearance exceeds the normal predetermined amount the pawl 38 will move to one or more adjacent teeth as previously described and as shown in Figure 5, so that the fulcrum point 34 of lever 23 will then be positioned upon release of the brake mechanism for normal piston travel upon subsequent brake application.

This condition and operation maintains until the rack member 28 reaches the opposite end of the slideway in housing 30, at which time the brake-shoes or wheels will have been worn to the maximum worn limit. When the mechanism has reached this maximum position and for the purpose of applying new brake-shoes or wheels, both pawls 38 and 44 must then manually be held out of rack engaging position so as to permit lever 23 and the movable elements to be moved back to the initial position, shown in Figure 7. Upon making brake application, either by means of the cylinder or the hand operated mechanism the slack take-up mechanism will then automatically adjust itself to the predetermined proper piston travel as soon as the brake mechanism is released, thereby ensuring proper piston travel and clearance during the subsequent brake applications.

As a result of my improved mechanism, all excess piston travel or slack in the brake gearing is automatically taken care of.

In order to enable my improved mechanism to be readily applied to the standard brake rigging in use for convenience, the segmental pinion has been shown formed on the sleeve 25, which may be readily applied to lever 23 on a car; but it will be understood that the segmental pinion 26 may be formed directly on the end of lever 23; and other modifications are possible and may be made without, however, departing from the spirit of my invention which has been described in terms employed merely as terms of description and not as terms of limitation.

What I claim is:

1. In combination with a lever of a foundation brake gear; a movably mounted fulcrum carrying element for said lever; means involving a rack and pinion whereby an anchor for the inner fulcrumed end of the lever is provided, a portion of said means being movable when said lever swings beyond its normal predetermined degree of travel; means whereby movement of said portion in one direction is prevented; and means whereby said fulcrum carrying element is locked against movement in one direction.

2. In combination with a lever of a foundation brake gear; a housing adapted to receive the inner end of said lever; a fulcrum carrying element for the inner end of said lever, slidably mounted in said housing; means whereby an anchor for the inner end of the lever is provided, a portion of said means being movable when said lever swings beyond its normal predetermined degree of travel; and means intermediate of said fulcrum carrying element and the housing whereby said element is held against movement in one direction.

3. Brake slack adjusting mechanism comprising, in combination with a lever of the foundation brake gear; a housing adapted to receive one end of said lever; a fulcrum carrying element for said lever, slidably mounted in said housing; an interlocking anchor for the inner end of said lever, a portion of said anchor being slidably mounted in said housing so as to move when said lever swings beyond its normal predetermined degree of travel and said element thereby shifted; means whereby said movable portion will be held in its shifted position; and means whereby the fulcrum carrying element is held against movement in one direction.

4. Brake slack adjusting mechanism comprising, in combination with a lever of the foundation brake gear; an elongated housing adapted to receive one end of said lever; a fulcrum carrying element for said lever, slidably mounted in the housing; a rack and pinion anchor for the inner end of said lever, the rack portion whereof is slidably mounted in the housing; means whereby said portion is held against movement in one direction; and means whereby said element is held against movement in one direction.

5. Brake slack adjusting mechanism comprising, in combination with a lever of the foundation brake gear, the inner end of said lever being provided with segmentally arranged teeth; an elongated housing adapted to receive the inner end of said lever; a member slidably mounted in said housing, said member having said lever fulcrumed thereon; a rack member slidably mounted in the housing and arranged in engagement with said segmentally arranged teeth whereby a shiftable anchor for the inner end of the lever is provided; yielding means whereby said rack member is held against movement in one direction; and yielding means whereby said first mentioned slidably mounted member is held against movement in one direction.

6. Brake slack adjusting mechanism comprising, in combination with a lever of the foundation brake gear of a railroad car, the inner end of the lever being provided with teeth; a supporting housing secured to a car underframe and adapted to receive the toothed end of said lever; a member slidably mounted in said housing and having the lever pivotally connected thereto; a rack-bar slidably mounted in the housing and engaged by the teeth of said lever whereby a shifting anchor for the lever is provided; a pawl carried by the housing and engaging with said rack-bar for holding the latter against movement in one direction; and means intermediate of said member and the housing whereby the member is held against movement in one direction.

7. Brake slack adjusting mechanism comprising, in combination with a lever of the foundation brake gear of a car, said lever being provided with an extension beyond its fulcrum point; a shiftable fulcrum member for said lever; movable anchor means for the extended end of the lever; means for locking said means against movement in one direction when the anchor means has moved beyond a predetermined degree; and means for automatically locking the fulcrum member in its shifted positions.

8. Brake slack adjusting mechanism comprising, in combination with a lever of the foundation brake gear of a car, said lever being provided with a toothed extension beyond its fulcrum point; a slidably mounted fulcrum member for said lever; movable anchor means arranged in engagement with the toothed extension of the lever, said means being shiftable and having teeth on its opposite side; automatic means arranged in engagement with the last mentioned teeth whereby movement of the means in one direction is prevented; and automatic means whereby the fulcrum member is locked against return movement toward its initial position.

9. Brake slack adjusting mechanism comprising, in combination with a lever of the foundation brake gear of a car, said lever being provided with an extension beyond its fulcrum point; a shiftable anchor with which the lever extension interengages; rack and pawl means whereby the anchor is held against return movement when it has shifted a predetermined degree due to excess degree of oscillation of the lever; a laterally shiftable fulcrum member for the lever, movable in the same direction as said anchor; and automatic means for locking the fulcrum member against movement in one direction.

10. Brake slack adjusting mechanism comprising, in combination with a lever of the foundation brake gear of a car, said lever having a toothed extension extending beyond the fulcrum point of the lever; an immovable elongated housing provided with a slot-way in its side wall through which the lever extends; an open sided member slidably mounted in the housing with the lever extending therethrough, said member carrying the fulcrum pin for said lever; a spring actuated pawl carried by said member; a rack on the wall of the housing with which said pawl engages to hold the member against movement in one direction; a rack bar slidably mounted on the housing and having interengaging relation with the toothed extension of said lever so as to provide a shifting anchor for the lever; and a spring actuated pawl mounted on the housing adapted to hold the rackbar in its shifted positions when the lever swings beyond its normal degree of oscillation.

MALCOLM S. JOHNSON.